United States Patent
Shinohara et al.

(10) Patent No.: US 11,795,056 B2
(45) Date of Patent: Oct. 24, 2023

(54) METHOD FOR PRODUCING ASTATINE

(71) Applicant: OSAKA UNIVERSITY, Suita (JP)

(72) Inventors: Atsushi Shinohara, Suita (JP); Atsushi Toyoshima, Suita (JP); Takashi Yoshimura, Suita (JP); Akimitsu Kanda, Suita (JP)

(73) Assignee: OSAKA UNIVERSITY, Suita (JP)

( * ) Notice: Subject to any disclaimer, the term of this patent is extended or adjusted under 35 U.S.C. 154(b) by 442 days.

(21) Appl. No.: 16/770,403

(22) PCT Filed: Dec. 7, 2018

(86) PCT No.: PCT/JP2018/045068
§ 371 (c)(1),
(2) Date: Jun. 5, 2020

(87) PCT Pub. No.: WO2019/112034
PCT Pub. Date: Jun. 13, 2019

(65) Prior Publication Data
US 2020/0290872 A1  Sep. 17, 2020

(30) Foreign Application Priority Data
Dec. 7, 2017 (JP) .................................. 2017-235141

(51) Int. Cl.
*C01B 7/00* (2006.01)
*G21G 1/00* (2006.01)

(52) U.S. Cl.
CPC ............... *C01B 7/00* (2013.01); *G21G 1/001* (2013.01); *C01B 2210/0009* (2013.01); *G21G 2001/0094* (2013.01)

(58) Field of Classification Search
CPC ..................... C01B 7/00; G21G 1/00
See application file for complete search history.

(56) References Cited

U.S. PATENT DOCUMENTS 4,681,727 A * 7/1987 Mirzadeh ................. G21H 5/02
  376/202
2016/0053345 A1 2/2016 Wilbur et al.

FOREIGN PATENT DOCUMENTS

SU           947025 A1   7/1982
WO   WO 2015/195042 A1  12/2015

OTHER PUBLICATIONS

D. Scott Wilbur et al., Evaluation of a Wet Chemistry Method for Isolation of Cyclotron Produced [211At]Astatine, Appl. Sci. 3, 636-655. (Year: 2013).*
Aneheim et al., "Automated astatination of biomolecules—a stepping stone towards multicenter clinical trials," *Sci. Rep.*, 5: 12025 (2015).
Lindegren et al., "Dry-distillation of astatine-211 from irradiated bismuth targets: a time-saving procedure with high recovery yields," *Appl. Radiat. Isot.*, 55(2): 157-160 (2001).
Nagatsu et al., "Production of $^{211}$at by a vertical beam irradiation method," *App. Radiat. Isot.*, 94: 363-371 (2014).
Japanese Patent Office, International Search Report in International Patent Application No. PCT/JP2018/045068 (dated Jan. 15, 2019) English translation.

* cited by examiner

*Primary Examiner* — Michael G. Hartley
*Assistant Examiner* — Jagadishwar R Samala
(74) *Attorney, Agent, or Firm* — Leydig, Voit & Mayer, Ltd.

(57) ABSTRACT

Provided is a method capable of separating and purifying astatine-211 in a high yield and dissolving same in a solution. A method for producing astatine-211, including a step of irradiating α ray to bismuth to produce astatine-211 in the bismuth, and a step of distilling the bismuth that received α ray irradiation with a carrier gas containing an inert gas, $O_2$ and $H_2O$ to separate and purify astatine-211, and dissolving the astatine-211 in a solution.

8 Claims, 1 Drawing Sheet

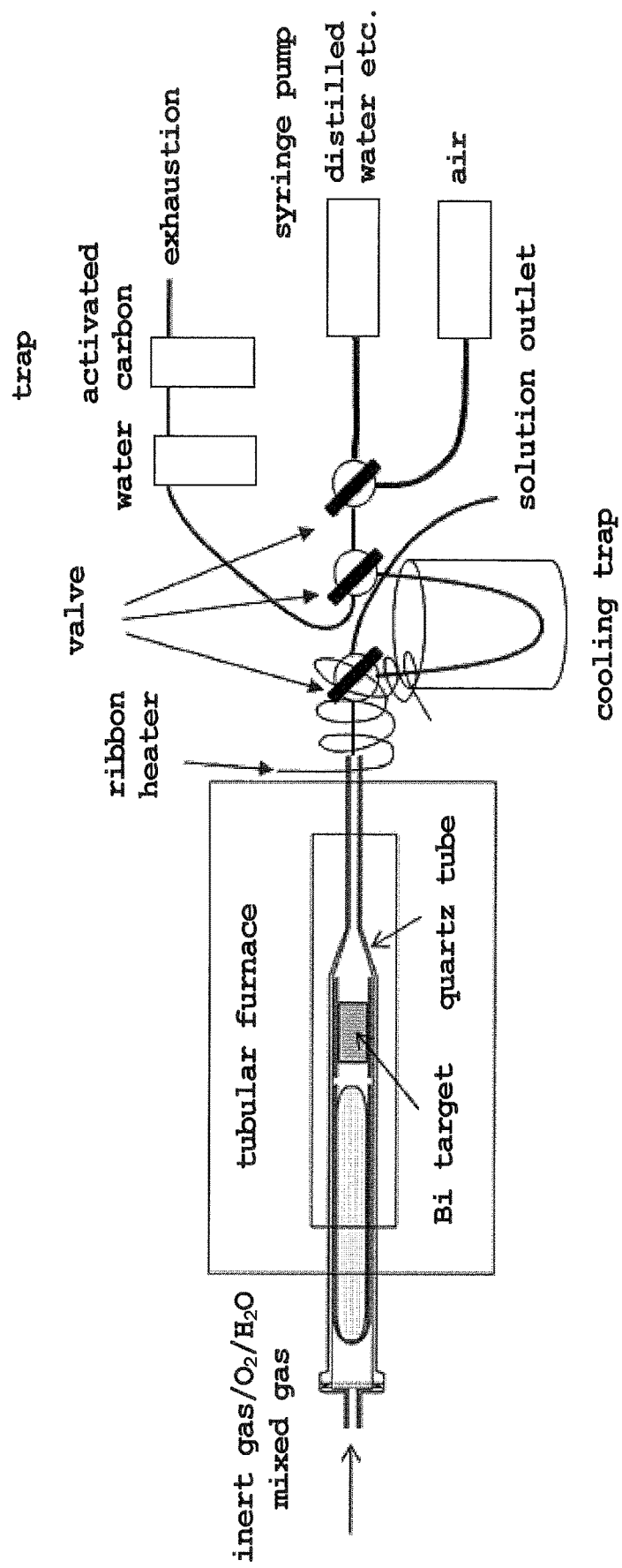

METHOD FOR PRODUCING ASTATINE

CROSS-REFERENCE TO RELATED APPLICATIONS

This patent application is the U.S. national phase of International Patent Application No. PCT/JP2018/045068, filed on Dec. 7, 2018, which claims the benefit of Japanese Patent Application No. 2017-235141 filed on Dec. 7, 2017, which are incorporated by reference in their entireties herein.

TECHNICAL FIELD

The present invention relates to a production method of astatine.

BACKGROUND ART

Utilization of Astatine-211 (At-211), which is an α ray emitting nuclide, for an α ray internal therapy has been expected since the 1950s, and the research for its clinical application has been actively performed in recent years. For application of astatine to clinical research, it is necessary to first generate astatine by irradiating a metallic bismuth target with an α beam using an accelerator, separate and purify astatine from the metal bismuth, and prepare an astatine solution for labeled drug synthesis to be performed next. Dry methods and wet methods are used as astatine separation and purification methods. In the wet method, since bismuth metal containing astatine is dissolved and then extracted by solvent extraction, it has the disadvantage of being contaminated by impurities derived from the reagent. On the other hand, in the dry method, metal bismuth containing astatine is heated to separate astatine by distillation, and then astatine is transported by airflow to allow for cooling trap, and dissolved in a solution. Thus, contamination of impurity is extremely low. However, in the conventional dry method, it is necessary to add an oxidant (non-patent document 1) and sodium hydroxide (non-patent document 2) to increase the recovery rate of astatine, and chemical constraints are imposed on the synthesis conditions of the astatine-labeled drug in the next step. Therefore, a new method permitting free selection of the solution properties and affording a high concentration astatine solution stably in a high yield is demanded.

DOCUMENT LIST

Non-Patent Documents non-patent document 1: E. Aneheim et al., Scientific Reports, 5, 12025 (2015).
non-patent document 2: K. Nagatsu et al., Applied Radiation and Isotopes, 94, 363-371 (2014).

SUMMARY OF INVENTION

Technical Problem

The purpose of the present invention is to provide a method capable of preparing astatine-211 in a high yield as a solution for labeled drug synthesis.

Solution to Problem

The present inventors have conducted intensive studies in an attempt to solve the aforementioned problem and found that astatine-211 can be separated and purified in a high yield and easily dissolved in a solution by distillation of a metallic bismuth target irradiated with an α beam with a carrier gas containing an inert gas, $O_2$ and $H_2O$, which resulted in the completion of the present invention.

That is, the present invention provides the following.
[1] A method for producing astatine-211, comprising a step of irradiating α ray to a metallic bismuth target to produce astatine-211 in the bismuth target, and a step of distilling the bismuth target that received α ray irradiation with a carrier gas comprising an inert gas, $O_2$ and $H_2O$ to separate and purify astatine-211, and dissolving the astatine-211 in a solution.
[2] The method of [1], wherein the inert gas is He or $N_2$.
[3] The method of [1] or [2], wherein the volume ratio of the inert gas:$O_2$ in the carrier gas is 99:1 to 51:49 and the content of $H_2O$ is 1 to 15 μg/cm$^3$.
[4] The method of any one of [1] to [3], wherein the flow rate of the carrier gas is 5 to 40 mL/min.
[5] The method of any one of [1] to [4], wherein the distillation temperature is 500 to 850° C.

Advantageous Effects of Invention

According to the present invention, a method capable of separating and purifying astatine-211 in a high yield and dissolving same in a solution is provided.

BRIEF DESCRIPTION OF DRAWINGS

FIG. 1 is a schematic drawing showing one embodiment of an apparatus for carrying out step 2 of the method of the present invention.

DESCRIPTION OF EMBODIMENTS

The present invention is explained in detail below.
The production method of astatine-211 of the present invention includes
a step of irradiating α beam to a metallic bismuth target to produce astatine-211 in the bismuth target (hereinafter to be referred to as step 1), and
a step of distilling the bismuth target that received α ray irradiation with a carrier gas containing an inert gas, $O_2$ and $H_2O$ to separate and purify astatine-211, and dissolving the astatine-211 in a solution (hereinafter to be referred to as step 2).
(Step 1)
The α beam is irradiated to the metallic bismuth target by using an accelerator. As the accelerator, any accelerator capable of accelerating α beam to 30 MeV can be used. A high energy α beam ($^4$He$^{2+}$, 28.2 MeV) obtained in the accelerator is irradiated to a metallic bismuth target, and astatine-211 is produced in the bismuth target by the nuclear reaction $^{209}$Bi($^4$He,2n)$^{211}$At.
(Step 2)
A schematic drawing of one embodiment of an apparatus for carrying out step 2 is shown in FIG. 1. In the following, step 2 is explained by referring to FIG. 1.
A dry distillation method is applied to separate and purify astatine-211 from a metallic bismuth target irradiated with an α beam. Utilizing the high volatility of astatine-211, astatine-211 is separated and purified from the bismuth target by heating and melting the metallic bismuth target at a high temperature to selectively evaporate astatine-211 and collected by cooling. In the present invention, focusing on the fact that the volatility and reactivity of astatine vary depending on the chemical species of astatine, astatine oxide that is easily volatilized and dissolved is formed by devising the composition of the carrier gas (inert gas/$O_2$/$H_2O$ mixed gas), and the distillation separation and dissolution recovery are performed easily and with high yield. The separation operation is performed, for example, by the following method.

The metallic bismuth target (astatine-211 is formed inside) irradiated with an α beam in step 1 is placed in a quartz tube in a tubular furnace. The temperature of the tubular furnace is increased to volatilize astatine-211 from the bismuth target. The volatilized astatine-211 is transported outside the quartz tube by a carrier gas (inert gas/$O_2$/$H_2O$ mixed gas). The carrier gas oxidizes bismuth and astatine-211 to form the desired astatine oxide. The transported astatine-211 then passes through a Teflon connector, valve and tube. The Teflon tube is cooled outside the tubular furnace with ice water, liquid nitrogen etc. to adsorb astatine-211 to the tube wall. After all of the astatine-211 has volatilized from the bismuth (the radioactivity of astatine-211 in the cooled Teflon tube is saturated), a given amount of a solution (distilled water, alcohol such as methanol, saline, etc.) is passed through by a syringe pump to dissolve astatine-211 in the solution (distilled water, alcohol such as methanol, saline, etc.). Thereafter, the solution in which astatine-211 is dissolved (distilled water, alcohol such as methanol, saline, etc.) is extruded to obtain the desired astatine solution (aqueous solution, alcohol solution such as methanol solution, saline solution, etc.).

Examples of the inert gas include He, Ne, Ar, Kr, Xe, $N_2$ and the like, preferably, He or $N_2$.

The volume ratio of the inert gas:$O_2$ in the carrier gas is preferably 99:1 to 51:49, more preferably 90:10 to 60:40, further preferably 80:20 to 70:30. When the volume ratio of the inert gas:$O_2$ in the carrier gas is outside the above-mentioned range, astatine oxide is not formed and problems such as a decrease in the yield of astatine-211 and the like occur.

The content of $H_2O$ in the carrier gas is preferably 1 to 15 μg/cm$^3$, more preferably 2 to 10 μg/cm$^3$, further preferably 5 to 8 μg/cm$^3$. When the content of $H_2O$ in the carrier gas is outside the above-mentioned range, problems such as a decrease in the yield of astatine-211 and the like occur.

In a preferable embodiment of the present invention, the volume ratio of the inert gas:$O_2$ in the carrier gas is 99:1 to 51:49, and the content of $H_2O$ is 1 to 15 μg/cm$^3$. In a more preferable embodiment of the present invention, the volume ratio of the inert gas:$O_2$ in the carrier gas is 90:10 to 60:40, and the content of $H_2O$ is 2 to 10 μg/cm$^3$. In a further preferable embodiment of the present invention, the volume ratio of the inert gas:$O_2$ in the carrier gas is 80:20 to 70:30, and the content of $H_2O$ is 5 to 8 μg/cm$^3$.

The flow rate of the carrier gas is preferably 5 to 40 mL/min, more preferably 10 to 30 mL/min, further preferably 15 to 25 mL/min. When the flow rate of the carrier gas is outside the above-mentioned range, problems such as a decrease in the yield of astatine-211 and the like occur.

The temperature of the tubular furnace (that is, distillation temperature) is preferably 500 to 850° C., more preferably 650 to 850° C., further preferably 800 to 850° C. When the temperature of the tubular furnace is outside the above-mentioned range, problems such as a decrease in the yield of astatine-211 and the like occur.

Using the above-mentioned method, astatine-211 can be obtained as an aqueous solution that is easy to use for the synthesis of labeled drugs in a high yield and a high concentration, which strikingly expands the possibility of drug synthesis. In addition, by using a solvent other than water (e.g., alcohol such as methanol or saline) when trapping astatine-211, astatine-211 can be obtained as a solution other than an aqueous solution, which expands the range of medical and chemical utilization. Furthermore, the mechanism of the apparatus for carrying out step 2 of the method of the present invention is simple, and the development of an apparatus capable of automatically purifying astatine-211 for medical use can also be expected based on the present invention.

EXAMPLE

The present invention is further explained in detail by the following Examples, which do not limit the present invention and may be varied without deviating from the scope of the present invention.

Examples 1-6 and Comparative Examples 1-2

(Step 1: Production of Astatine-211)

A high energy α beam ($^4$He$^{2+}$, 28.2 MeV) obtained in the accelerator was irradiated to bismuth, and astatine-211 was produced in the bismuth by the nuclear reaction $^{209}$Bi($^4$He, 2n)$^{211}$At.

Preparation of Bismuth (Bi) Target

Bi target was prepared by a vacuum vapor deposition method. A commercially available Bi metal (granular) was placed on a tantalum metal boat and set inside a vapor deposition apparatus. An aluminum (Al) foil (thickness 10 μm) was attached to the top of the metal boat as a backing for the target. After depressurizing the inside of the bell jar, the metal boat was heated with an electric current to volatilize the Bi metal and vapor deposit same on the Al foil. The vapor deposited Bi metal was obtained with a thickness of 5 to 30 mg/cm$^2$.

Irradiation to Bi Target

The prepared Bi target was attached to the holder and the surface was covered with an aluminum foil (thickness 10 μm) to prevent scattering. Then, the entire holder was set at the irradiation position in the irradiation vessel. The Bi target was placed at an angle of 45 degrees to the beam axis direction to increase the cooling efficiency by widening as much as possible the area of the Bi target to be hit by the beam. The inside of the irradiation vessel was substituted with helium gas, and irradiated with an α beam of 1 to 2 μA. A 30 MeV α beam from the AVF cyclotron passed through the vacuum window (Havar foil) and aluminum cover and was injected to the Bi target at 28.2 MeV. During irradiation, helium gas was sprayed onto the Bi target at a flow rate of not less than 10 L/min to cool the target, and distilled water was flown into the target holder behind the beam to cool the target with water.

(Step 2: Separation and Purification of Astatine-211)

The Bi target after irradiation of the α beam was placed in a quartz tube, and set in a tubular furnace such that the Bi target was at the center of the tube. The downstream side was connected to a quartz tube and a Teflon trap for cooling (inner diameter 2 mm, length 20 cm) using a Teflon connector, a switching valve and a tube, and the upstream side was connected to a tube for introducing a mixed gas. After the connection, the valve at the top of the trap was closed to reduce the pressure in the quartz tube, and He/$O_2$/$H_2O$ mixed gas (carrier gas) was introduced until the pressure in the system reached 1 atm. After reaching 1 atm, the valve was opened to flow the mixed gas to the cooling trap, trap, and exhaustion system. To prevent the deposition of volatile astatine oxide, the area from the tubular furnace outlet to the top of the trap was heated to 130° C. with a ribbon heater. The cooling trap was cooled with ice water while flowing the mixed gas, and the tubular furnace was heated to 850° C. In addition, a CdZnTe semiconductor detector was placed above the cooling trap to monitor the radiation (X-rays) emitted from astatine-211, and the heating was performed while confirming the collection in the cooling trap. Heating was continued for another 30 min after the tubular furnace temperature reached 850° C. Two valves at the top of the cooling trap were then operated to switch the pathway and the cooling trap was removed from the ice water. Using a syringe pump, 100 µL of distilled water was introduced into the cooling trap, air was sent using another syringe pump, and the 100 µL of distilled water was flown into the cooling trap at a flow rate of 250 µL/min to dissolve the collected astatine-211. Finally, an aqueous solution in which astatine-211 was dissolved was collected in a compact container.

The radiation of astatine-211 in the Bi target before distillation and the radiation of astatine-211 in the final compact container were measured with a germanium semiconductor detector to quantify the astatine-211 contained in each. The chemical yield under each condition was calculated with corrections for radioactive decay. The composition (He:$O_2$ volume ratio and $H_2O$ content in the carrier gas) of the carrier gas and chemical yield were as follows.

TABLE 1

|  | He:$O_2$ volume ratio | $H_2O$ content (µg/cm$^3$) | chemical yield (%) |
| --- | --- | --- | --- |
| Example 1 | 75:25 | 6.0 | 78 |
| Example 2 | 75:25 | 5.5 | 74 |
| Example 3 | 75:25 | 4.0 | 67 |
| Example 4 | 75:25 | 2.5 | 64 |
| Example 5 | 75:25 | 2.3 | 68 |
| Example 6 | 75:25 | 1.4 | 52 |
| Comparative Example 1 | 100:0 | 3.0 | 33 |
| Comparative Example 2 | 100:0 | 3.1 | 37 |

Examples 7 and 8

In the same manner as in Examples 1 to 6 except that $N_2/O_2/H_2O$ mixed gas was used as the carrier gas, astatine-211 was obtained. The composition ($N_2$:$O_2$ volume ratio and $H_2O$ content in the carrier gas) of the carrier gas and chemical yield were as follows.

TABLE 2

|  | $N_2$:$O_2$ volume ratio | $H_2O$ content (µg/cm$^3$) | chemical yield (%) |
| --- | --- | --- | --- |
| Example 7 | 75:25 | 6.0 | 66 |
| Example 8 | 75:25 | 3.5 | 63 |

As is clear from Tables 1 and 2, in Examples 1-8 in which an inert gas/$O_2$/$H_2O$ mixed gas was used as the carrier gas (in particular, He or $N_2$ was used as the inert gas and the composition of the carrier gas (inert gas:$O_2$ volume ratio and $H_2O$ content in the carrier gas) was set to a specific range), astatine-211 could be separated and purified in high yields.

INDUSTRIAL APPLICABILITY

According to the present invention, a method capable of separating and purifying astatine-211 in a high yield and dissolving same in a solution is provided.

This application is based on patent application No. 2017-235141 filed in Japan, the contents of which are encompassed in full herein.

The invention claimed is:

1. A method for producing astatine-211, comprising
a step of irradiating α ray to bismuth to produce astatine-211 in the bismuth, and
a step of distilling the bismuth that received α ray irradiation with a carrier gas comprising an inert gas, $O_2$ and $H_2O$ to separate and purify astatine-211, and dissolving the astatine-211 in a solution.

2. The method according to claim 1, wherein the inert gas is He or $N_2$.

3. The method according to claim 1, wherein the volume ratio of the inert gas:$O_2$ in the carrier gas is 99:1 to 51:49 and the content of $H_2O$ is 1 to 15 µg/cm$^3$.

4. The method according to claim 1, wherein the carrier gas has a flow rate of 5 to 40 mL/min.

5. The method according to claim 1, wherein the distillation temperature is 500 to 850° C.

6. The method according to claim 2, wherein the volume ratio of the inert gas:$O_2$ in the carrier gas is 99:1 to 51:49 and the content of $H_2O$ is 1 to 15 µg/cm$^3$.

7. The method according to claim 6, wherein the carrier gas has a flow rate of 5 to 40 mL/min.

8. The method according to claim 7, wherein the distillation temperature is 500 to 850° C.

* * * * *